US012010461B2

(12) United States Patent
Anderson et al.

(10) Patent No.: US 12,010,461 B2
(45) Date of Patent: Jun. 11, 2024

(54) MULTIMEDIA SYSTEM FOR A SCALABLE INFOTAINMENT SYSTEM OF A MOTOR VEHICLE

(71) Applicant: GM Global Technology Operations LLC, Detroit, MI (US)

(72) Inventors: Esther Anderson, Canton, MI (US); Jace C. Stokes, Farmington Hills, MI (US); Fan Bai, Ann Arbor, MI (US); Chuan Li, Troy, MI (US); Mark T. Gaylord, Lake Orion, MI (US); Wende Zhang, Birmingham, MI (US); Paul Andrew Justin, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 222 days.

(21) Appl. No.: 17/848,867

(22) Filed: Jun. 24, 2022

(65) Prior Publication Data
US 2023/0421726 A1    Dec. 28, 2023

(51) Int. Cl.
| H04N 7/18 | (2006.01) |
| B60R 1/22 | (2022.01) |
| B60R 11/00 | (2006.01) |
| B60R 11/04 | (2006.01) |

(52) U.S. Cl.
CPC ............. *H04N 7/181* (2013.01); *B60R 1/22* (2022.01); *B60R 2011/0078* (2013.01); *B60R 11/04* (2013.01)

(58) Field of Classification Search
CPC ........... H04N 7/181; B60R 1/22; B60R 11/04; B60R 2011/0078
See application file for complete search history.

(56) References Cited

U.S. PATENT DOCUMENTS

| 9,307,217 | B1 | 4/2016 | Day |
| 9,813,542 | B1 | 11/2017 | Shan et al. |
| 9,877,064 | B2 | 1/2018 | Bai et al. |
| 10,462,193 | B2 | 10/2019 | Grimm et al. |
| 10,635,452 | B2 | 4/2020 | Bai et al. |
| 2016/0272113 | A1* | 9/2016 | Lopez-Hinojosa ......... G08G 1/0967 |
| 2017/0026684 | A1 | 1/2017 | Shan et al. |
| 2017/0026694 | A1 | 1/2017 | Bai et al. |
| 2017/0034551 | A1 | 2/2017 | Bai et al. |
| 2019/0123952 | A1 | 4/2019 | Hrabak et al. |

* cited by examiner

*Primary Examiner* — Farzana Hossain
(74) *Attorney, Agent, or Firm* — Vivacqua Crane, PLLC (57) ABSTRACT

A multimedia system is provided for a scalable infotainment system of a motor vehicle. The scalable infotainment system includes a camera, which is releasably attached to the motor vehicle and supports camera software components for generating a media signal. The multimedia system includes a media player and a computer attached to the motor vehicle. The computer has a processor and a non-transitory computer readable storage medium, which stores player software components including multiple streaming protocols used by the media player to play a media stream. The processor is programmed to transmit to the camera a player setup signal including data associated with the player software components. The processor is further programmed to receive from the camera a media signal associated with a media stream generated by the camera by using a common one of the streaming protocols supported by the camera and the media player.

20 Claims, 4 Drawing Sheets

MULTIMEDIA SYSTEM FOR A SCALABLE INFOTAINMENT SYSTEM OF A MOTOR VEHICLE

INTRODUCTION

The present disclosure relates to infotainment systems of motor vehicles, and more particularly to a multimedia system for a scalable infotainment system, with the multimedia system having a media player for playing a media stream generated by a camera, which is releasably attached to the motor vehicle and is not native to the multimedia system.

Automotive manufacturers are continuously developing monitoring systems that improve driver awareness. These monitoring systems typically include video display devices electrically connected to multiple cameras, which are native to the motor vehicle and the monitoring systems. The cameras are integrated within various portions of the motor vehicle. As but one example, a heavy duty truck can include cameras integrated within a front end structure, a rear end structure, a driver side structure, and a passenger side structure. These cameras capture video frames, and a video processor can stitch the video frames together to create an aerial view of the truck. This aerial view can assist the driver with precisely parking a vehicle, such as a large heavy-duty truck in narrow parking spot. By way of another example, certain luxury vehicles can have a camera mounted to a rear end structure and facing rearwardly, with a rear view mirror display device that displays video captured by the camera. This rear view mirror display device displays a rear view from the vehicle without certain obstructions blocking the view, such as head rests of second row seats, a low roof line, and/or a bike rack attached to the vehicle. In these examples, the cameras are integral portions of vehicle systems and components exclusively installed by the OEM. The cameras may not be moved to other portions of the vehicle for capturing videos of other views that may interest the driver. Similarly, these systems may not permit third-party aftermarket cameras to be positioned in desired locations about the motor vehicle, with a video display device of the vehicle displaying video captured by the cameras.

Thus, while existing video monitoring systems of motor vehicles may achieve their intended purpose, there is a need for a new and improved scalable infotainment system that addresses these issues.

SUMMARY

According to several aspects of the present disclosure, a multimedia system is provided for a scalable infotainment system of a motor vehicle. The scalable infotainment system includes a camera, which is releasably attachable to the motor vehicle and is not native to the multimedia system. The camera supports a plurality of camera software components for generating a media signal associated with a media stream, in response to the camera capturing an image and/or a video. The multimedia system includes a media player and a computer, which are attached to the motor vehicle. The computer includes one or more processors electrically communicating with the media player. The computer further includes a non-transitory computer readable storage medium ("CRM"), which stores a plurality of player software components having multiple streaming protocols. The CRM further stores instructions, such that the processor is programmed to wirelessly connect with the camera. The processor is further programmed to generate a player setup signal including data associated with the player software components. The processor is further programmed to transmit the player setup signal to the camera, with the camera determining a common one of the streaming protocols supported by the media player and the camera. The camera generates the media stream by using the common one of the streaming protocols. The processor is further programmed to receive the media signal from the camera by using the common one of the streaming protocols. The processor is further programmed to transmit the media signal to the media player, such that the media player plays the media stream by using the common streaming protocol.

In one aspect, the processor generates the player setup signal, which includes data further associated with: a service set identifier (SSID), a password, a streaming Uniform Resource Locator (URL), a camera identifier, a resolution, a frame rate, a device type, a field of view parameter, and/or a vehicle stabilization feature parameter.

In another aspect, the processor is wirelessly connectable to the camera via a first network, with the first network capable of supporting a first capacity of connected devices and having a first bandwidth. The processor transmits data associated with the player software components to the camera via the first network.

In another aspect, the media player includes a Human Machine Interface (HMI) touchscreen display device for generating an input signal, in response to the HMI touchscreen display device receiving an input from a user. The processor generates a command signal and transmits the command signal to the camera via the first network, in response to the processor receiving the input signal from the HMI touchscreen display device. The camera performs a predetermined function, in response to the camera receiving the command signal from the processor.

In another aspect, the media player is configured to display a machine readable optical label, which is associated with the player software components and adapted to be captured by the camera. The camera determines the player software components based on the machine readable optical label.

In another aspect, the processor is further wirelessly connectable to the camera via a second network. The second network supports a second capacity of connected devices that is higher than the first capacity of connected devices associated with the first network. The second network has a second bandwidth that is higher than the first bandwidth associated with the first network. The processor receives the media signal from the camera via the second network.

According to several aspects of the present disclosure, a scalable infotainment system for a motor vehicle includes one or more cameras, which are releasably attachable to the motor vehicle. The camera captures an image and/or a video. The camera supports a plurality of camera software components for generating a media signal associated with a media stream, in response to the camera capturing the image and/or the video. The scalable infotainment system further includes a multimedia system integrated within the motor vehicle. The multimedia system includes a media player and a computer, which are attached to the motor vehicle. The computer includes one or more processors electrically communicating with the media player. The computer further includes a non-transitory computer readable storage medium (CRM), which stores a plurality of player software components having multiple streaming protocols. The CRM further stores instructions, such that the processor is programmed to wirelessly connect with the camera. The processor is further programmed to generate a player setup signal including data associated with the player software components. The processor is further programmed to transmit the player setup signal to the associated camera, with the camera determining a common one of the streaming protocols supported by the media player and the camera. The camera generates the media signal by using the common streaming protocol. The processor is further programmed to receive the media signal from the associated camera by using the common streaming protocol. The processor is further programmed to transmit the media signal to the media player, with the media player playing the media stream by using the common streaming protocol. The camera is not native to the multimedia system.

In one aspect, the processor generates the player setup signal, which includes data further associated with: a service set identifier (SSID), a password, a streaming Uniform Resource Locator (URL), a camera identifier, a resolution, a frame rate, a device type, a field of view parameter, and/or a vehicle stabilization feature parameter.

In another aspect, each one of the cameras includes a controller for receiving the player setup signal from the processor. The controller determines the common streaming protocol that is supported by the media player and the camera, in response to the controller receiving the player setup signal from the processor of the computer for the multimedia system.

In another aspect, the processor is wirelessly connectable to the associated camera via a first network. The first network has a first bandwidth and a first capacity of connected devices, and the processor transmits data associated with the player software components to the associated camera via the first network.

In another aspect, the media player includes an HMI touchscreen display device for generating an input signal, in response to the HMI touchscreen display device receiving an input from a user. The processor generates a command signal and transmits the command signal to the camera via the first network, in response to the processor receiving the input signal from the HMI touchscreen display device. The camera performs a predetermined function, in response to the camera receiving the command signal from the processor.

In another aspect, the associated camera includes an access point for connecting to a second network, and the associated camera is configured to perform the predetermined function. The predetermined function includes the associated camera being disposed in a power-saving sleep mode, enabling the access point, and/or disabling the access point.

In another aspect, the media player is configured to display a machine readable optical label, which is associated with the player software components and adapted to be captured by the camera. The camera determines the player software components based on the machine readable optical label.

In another aspect, the processor is further wirelessly connectable to the camera via a second network. The second network is capable of supporting a second capacity of connected devices, which is higher than the first capacity of connected devices associated with the first network. The second network further has a second bandwidth, which is higher than the first bandwidth associated with the first network. The processor receives the media signal from the camera via the second network.

In another aspect, the multimedia system further includes one or more remote servers for storing data associated with the player software components, and the associated camera includes a built-in cellular module. The built-in cellular module is configured to use a cellular network to connect the controller to the remote server, such that the controller receives the data associated with the player software components from the remote server.

According to several aspects of the present disclosure, a method is provided for operating a multimedia system for a scalable infotainment system of a motor vehicle. The scalable infotainment system includes one or more cameras and a multimedia system. The multimedia system includes a media player and a computer, which are attached to the motor vehicle. The computer includes one or more processors and a non-transitory computer readable storage medium (CRM), which stores a plurality of player software components having multiple streaming protocols. The method includes releasably attaching the camera to the motor vehicle. The method further includes wirelessly connecting the processor to an associated one of the cameras. The method further includes generating, using one or more remote servers and the processor, a player setup signal including data associated with the player software components. The method further includes transmitting, using the remote server and the processor, the player setup signal to the associated camera. The method further includes determining, using the at least one camera, a common one of the streaming protocols supported by the media player and the at least one camera, in response to the at least one camera receiving the player setup signal. The method further includes wirelessly connecting, using the processor via a second network, to the associated camera. The method further includes capturing, using an image sensor of the camera, an image and/or a video. The method further includes generating, using the camera, a media signal associated with a media stream by using the common one of the streaming protocols in response to the image sensor capturing at least one of the image and the video. The method further includes receiving, using the processor via the second network, the media signal from the associated camera. The method further includes transmitting, using the processor, the media signal to the media player. The method further includes playing, using the media player, the media stream by using the common streaming protocol.

In one aspect, the method further includes generating, using the remote server or the processor, the player setup signal, with the player setup signal including data further associated with: a service set identifier (SSID), a password, a streaming Uniform Resource Locator (URL), a camera identifier, a resolution, a frame rate, a device type, a field of view parameter, and/or a vehicle stabilization feature parameter. The method further includes scanning, using a controller of the camera, via the second network in response to the controller receiving the data from the remote server and/or the processor.

In another aspect, the method further includes registering, using a controller of the camera, the camera by creating a camera-side device file in a camera operating system of the camera. The method further includes transmitting, using the controller, a request signal to the processor. The method further includes registering, using the processor, the camera by creating a vehicle-side device file in a vehicle operating system, in response to the processor receiving the request signal from the camera. The method further includes writing, using the controller, data to the camera-side device file, in response to the camera capturing the image and/or the video. The method further includes transmitting, using the controller of the camera, the media signal to the processor. The method further includes generating, using the controller of the camera, the media signal associated with the media stream.

In another aspect, the method further includes registering, using a controller of the camera, the camera by creating a camera-side device file in a camera operating system of the camera. The method further includes transmitting, using the controller, a request signal to the processor, with the request signal including data associated with at least a device type and traffic information. The method further includes registering, using the processor, the camera by creating a vehicle-side device file in a vehicle operating system, in response to the processor receiving the request signal from the camera. The method further includes capturing, using an image sensor of the camera, the image and/or the video. The method further includes generating, using the controller of the camera, the media stream in response to the controller processing data associated with the image and/or the video. The method further includes writing, using the controller, the media stream to the camera-side device file. The method further includes writing, using the processor, the media stream to the vehicle-side device file in response to the processor receiving the media signal from the controller of the camera. The method further includes playing, using the media player, the media stream in response to the processor processing data associated with the media stream.

In another aspect, the method further includes transmitting, using a vehicle-side user application of the processor, the common streaming protocol from the controller of the camera to a wireless streaming protocol adaptor of the processor, with the wireless streaming protocol adaptor being a kernel functionality. The method further includes processing, using the wireless streaming protocol adaptor, the media stream by at least one of: decoding the media stream; rendering the media stream; removing, using the wireless streaming protocol adaptor, a plurality of headers associated with a TCP/IP communication from the media stream; and/or using a camera identifier to deliver data traffic to a user space application.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
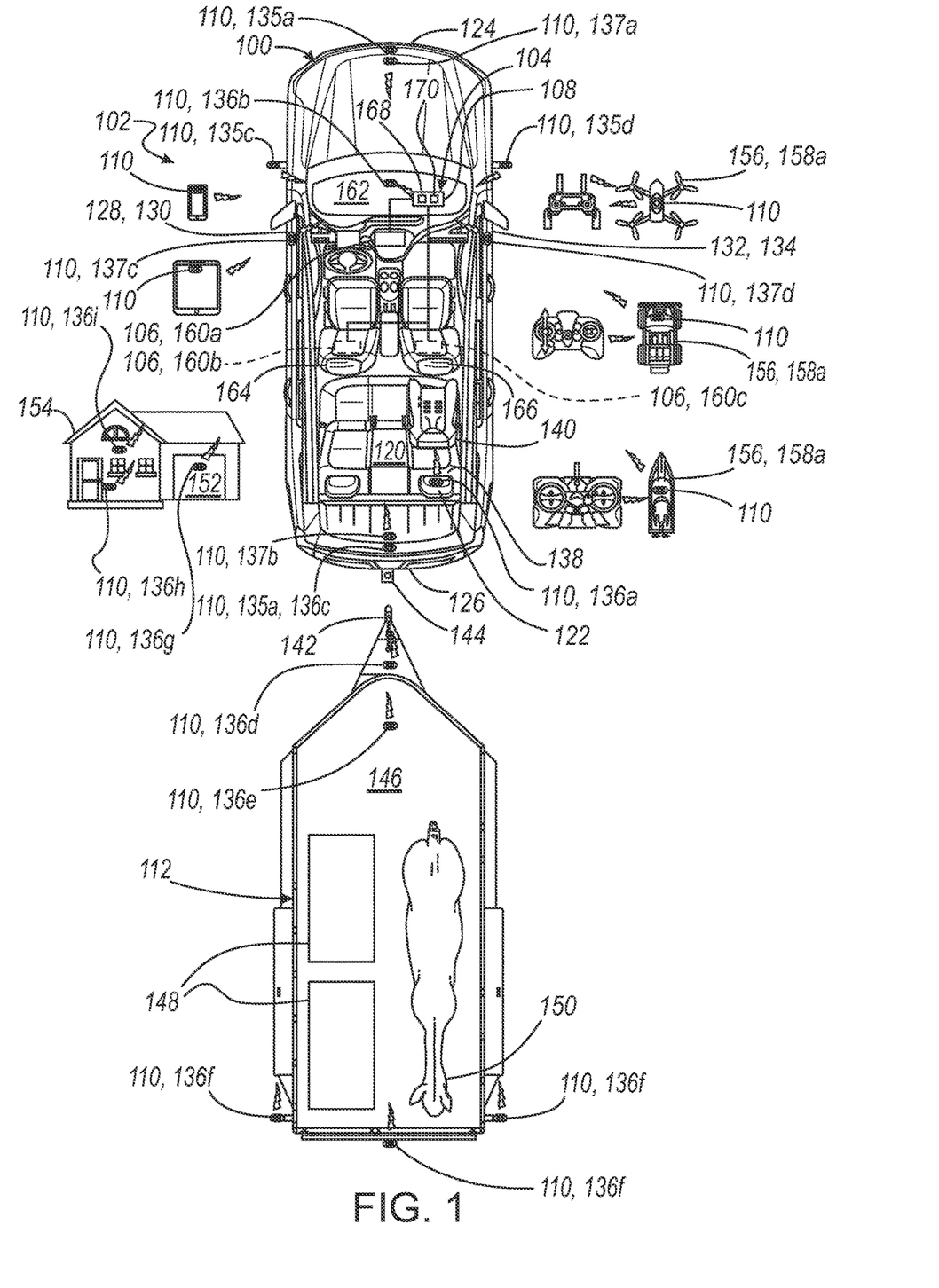
FIG. 1 is a schematic diagram of one example of a motor vehicle having a scalable infotainment system with a multimedia system for wirelessly connecting to third party cameras and displaying custom in-vehicle interior and exterior views.

Referring to FIG. 1, one example of a motor vehicle 100 includes a scalable infotainment system 102 with a multimedia system 104 integrated within the motor vehicle 100. The multimedia system 104 has a media player 106 (e.g., Infotainment Head Unit) and a computer 108 (e.g., Vehicle Control Unit) as described in detail below. The scalable infotainment system 102 further includes one or more cameras 110, which wirelessly communicate with the multimedia system 104 and are attachable to any portion of the motor vehicle 100, such that the media player 106 can display in-vehicle interior views and exterior views. The cameras 110 can be third party stand-alone cameras, which are not native to the multimedia system 104 or the motor vehicle 100. In other examples, the cameras 110 can be releasably attachable to a trailer 112 or a residential building, and/or the cameras 110 can be integrated into portable handheld devices (e.g., built into smartphones, computer tablets, webcams, etc.). Each of the cameras 110 includes an image sensor 114 (FIG. 2) for capturing an image and/or a video. Each of the cameras 110 further includes a controller 116 (FIG. 2) for wirelessly connecting to the media player 106. Each of the cameras 110 further includes a memory 118 (FIG. 2) for storing a plurality of camera software components, in response to the image sensor 114 capturing the image and/or the video. The camera software components includes multiple streaming protocols for generating a media signal associated with a media stream, in response to the image sensor 114 capturing the image and/or the video. The cameras 110 can connect to the computer 108 and wirelessly stream the camera view on the media player 106. The scalable infotainment system 102 allows a user to use their own aftermarket camera to stream media to the media player rather than purchase an exclusive OEM-designated camera. In some non-limiting examples detailed below, the multimedia system 104 can wirelessly connect to the cameras 110 by using BLUETOOTH, NFC, QR code and cloud-based service connections without using a cell phone to wirelessly connect the multimedia system 104 and the cameras 110 to one another. However, it is contemplated that other non-limiting examples of the scalable infotainment system can include a cell phone for wirelessly connecting the camera to the multimedia system. The multimedia system 104 provides a universal wireless streaming protocol adaptor to accommodate different streaming software components used in different commercial brands of third party WIFI-enabled cameras 110, including virtual IO, video content direct delivery, and WIFI MAC layer Information Element-based SDP advertisement.

As shown in FIG. 1, the motor vehicle 100 has a passenger cabin 120 with a surface 122 disposed therein, a front end structure 124 positioned forward of the passenger cabin 120, a rear end structure 126 positioned rearward of the passenger cabin 120, a driver side structure 128 positioned proximal to a first side 130 of the passenger cabin 120, and a passenger side structure 132 positioned proximal to a second side 134 of the passenger cabin 120 opposite to the first side 130. Non-limiting examples of the motor vehicle include a land vehicle, such as a sedan, a light duty truck, a heavy duty truck, a sport utility vehicle, a van, a motor home, a motorcycle, a recreation vehicle, or other suitable vehicles. The motor vehicle is an autonomous vehicle, a semi-autonomous vehicle, or a non-autonomous (manual) vehicle. However, it is contemplated that other examples of the motor vehicle can include an aircraft, a watercraft, or other suitable vehicles.

Non-limiting examples of the cameras 110 can include action cameras 135a-135d, such as WIFI-enabled GOPRO cameras, LOGITECH MEVO STARTER cameras, INSTA360 cameras, and the like. In other non-limiting examples, the cameras 110 can be built-in components of suitable devices, such as smartphone cameras, tablet cameras, or trail cameras with motion sensors. These cameras 135a-135d can be mounted via any suitable mounting hardware (e.g., suction cups, magnets, clips, brackets, straps, clamps, etc.) to any suitable surface 122 disposed in the passenger cabin 120, the front end structure 124, the rear end structure 126, the driver side structure 128, and/or the passenger side structure 132. It is also contemplated that the cameras can be separate from the motor vehicle and positioned within a range for communicating with the multimedia system.

In one non-limiting example, the cameras 110 can further include a child-monitoring camera 136a that is mounted to a surface 122 within the passenger cabin 120, such as a surface of a second row seat 140, to capture video of a rear-facing car seat 140 for infants or toddlers. In another non-limiting example, the cameras 110 can include one or more forward-facing cameras 110 mounted to the front end structure 124, the driver side structure 128, and/or the passenger side structure 132 for capturing a video of one or more approach angles associated with off-roading or a racing line associated with amateur racing, autocross, or other motorsports. In still another non-limiting example, the cameras 110 can include a security camera 136b (e.g., a WIFI-enabled motion-activated trail camera or the like) positioned within the passenger cabin 120 for capturing a video of the passenger cabin of the motor vehicle 100, e.g., a battery electric vehicle. In yet another non-limiting example, the cameras 110 can include a rear-facing camera 136c for capturing video of a trailer 112 attached to the motor vehicle 100. In another non-limiting example, the cameras 110 can include a hitch camera 136d mounted to a coupler 142 of the trailer 112 and facing forward to capture video that will assist a driver with positioning the motor vehicle 100 for mounting a trailer hitch 144 extending from the motor vehicle to the coupler 142 of the trailer 112. In still another non-limiting example, the cameras 110 can include a trailer monitoring camera 136e attached to the trailer 112 (e.g., a cargo trailer, a horse trailer, or the like) for monitoring an interior 146 of the trailer 112 and any cargo 148 or livestock 150 transported within the trailer 112. In another non-limiting example, the cameras 110 can include one or more external trailer cameras 136f attached to a rear end of the trailer 112, driver side of the trailer 112, and/or a passenger side of the trailer 112. In yet another example, the cameras 110 can include four wide-angle cameras 137a-137d attached to an associated one of the front end structure 124, the rear end structure 126, the driver side structure 128, and the passenger side structure 132 for capturing video that will facilitate the driver with precisely driving the motor vehicle 100 into narrow areas, such as an open parking spot between two occupied parking spots. In still another example, the cameras 110 can include a garage camera 136f mounted to a parking structure 152 to capture video of the motor vehicle 100 approaching a parking spot within the garage, a doorbell camera 136g mounted to a residence, and/or a home security camera 136h positioned within a residential building 154. In still another example, the cameras 110 can include be mounted to or built into a remotely controlled vehicle 156, such as a flying drone 158a, a remotely controlled car 158b, and/or a remotely controlled water craft 158c.

Referring back to FIG. 1, the multimedia system 104 includes a media player 106 attached to and integrated within the motor vehicle 100. In one non-limiting example, the media player 106 can be an Infotainment Head Unit (IHU) with a Human Machine Interface (HMI) touchscreen display device 160a for generating an input signal, in response to the HMI touchscreen display device 160a receiving an input from a user. Furthermore, in this non-limiting example, the HMI display device 160a is integrated within a center stack of a dashboard 162 of the motor vehicle 100. The media player 106 can further include two HMI touchscreen display devices 160b, 160c integrated within a rear side of a driver seat 164 and a rear side of a front passenger seat 166, such that vehicle occupants in the second row 138 can view the image and/or video captured by the associated cameras and operate the HMI touchscreen display devices 160b, 160c to control the associated cameras 110. It is contemplated that the media player can include any number of HMI touchscreen display devices integrated in any portion of the vehicle or be releasably attached to the motor vehicle. As described in further detail below, the input from the user can trigger a predetermined function by one or more cameras 110.

Figure 2:
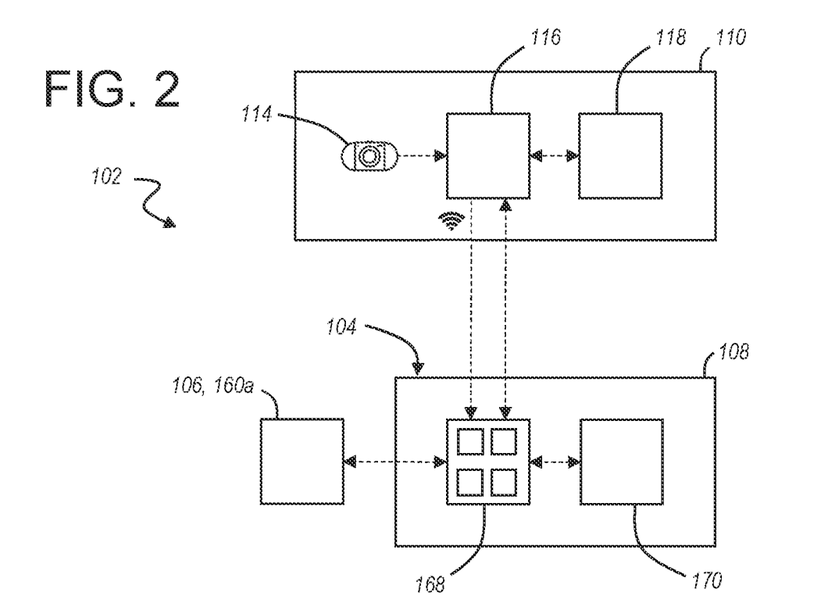
FIG. 2 is an enlarged view of one portion of the scalable infotainment system of FIG. 1, illustrating the multimedia system having a media player and a computer for connecting with the cameras via a first network to determine a common streaming protocol that is supported by the media player and the camera and further for connecting with the cameras via a second network for transmitting a media signal from the camera to the media player.

The multimedia system 104 further includes a computer 108, which is attached to the motor vehicle 100. The computer 108 includes one or more processors 168, which electrically communicate with the media player 106 and are wirelessly connectable to the cameras 110 by, for example, a first network, such as a Personal Area Network (PAN) (e.g., a BLUETOOTH connection, a ZIGBEE connection, or the like). The first network has a first bandwidth and supports a first capacity of connected devices. In other non-limiting examples, the first network can be a WIFI Wireless Local Area Network (WLAN) without using the PAN. The computer 108 further includes a non-transitory computer readable storage medium 170 (CRM), which stores a plurality of player software components including multiple streaming protocols. The CRM 170 further stores instructions, such that the processor 168 is programmed to wirelessly connect with one or more cameras 110. The multimedia system 104 and the associated cameras 110 can determine a common streaming protocol that is supported by the multimedia system 104 and the cameras 110. The processor 168 transmits data associated with the player software components to the associated camera 110 via the first network. More specifically, the processor 168 is programmed to generate a player setup signal and transmit the player setup signal to the cameras 110. The player signal can include data associated with: the player software components, a service set identifier (SSID), a password, a streaming Uniform Resource Locator (URL), a camera identifier, a resolution, a frame rate, a device type, a field of view parameter, and/or a vehicle stabilization feature parameter. Each one of the cameras 110 includes a controller 116 receiving the player setup signal from the processor 168, and the controller 116 determines the common streaming protocol that is supported by the media player 106 and the associated camera 110, in response to the controller 116 receiving the player setup signal from the processor 168 of the computer 108. The controller 116 of the associated camera 110 generates the media signal associated with the media stream by using the common streaming protocol.

The processor 168 is further wirelessly connectable to the camera 110 via a second network, such as a WIFI Wireless Local Area Network connection (WIFI WLAN). In this non-limiting example, the second network can be capable of supporting a second capacity of connected devices, which is higher than the first capacity of connected devices supported by the first network. Furthermore, the second network has a second bandwidth, which is higher than the first bandwidth associated with the first network. The processor 168 receives the media signal from the controller 116 of the camera 110 via, for example, the second network. The processor 168 is further programmed to transmit the media signal to the media player 106, such that the media player 106 plays the media stream by using the common streaming protocol.

Furthermore, the processor 168 generates a command signal and transmits the command signal to the camera 110 via the first network, in response to the processor 168 receiving the input signal from the HMI touchscreen display device 160. The camera 110 performs the predetermined function, in response to the camera 110 receiving the command signal from the processor 168. Each of the cameras 110 includes an access point for connecting to the second network. Each of the cameras 110 is configured to perform a predetermined function, which can include the camera 110 being disposed in a power-saving sleep mode, enabling the access point, and disabling the access point, in response to the associated camera 110 receiving the command signal from the processor 168 via the first network.

Figure 3:
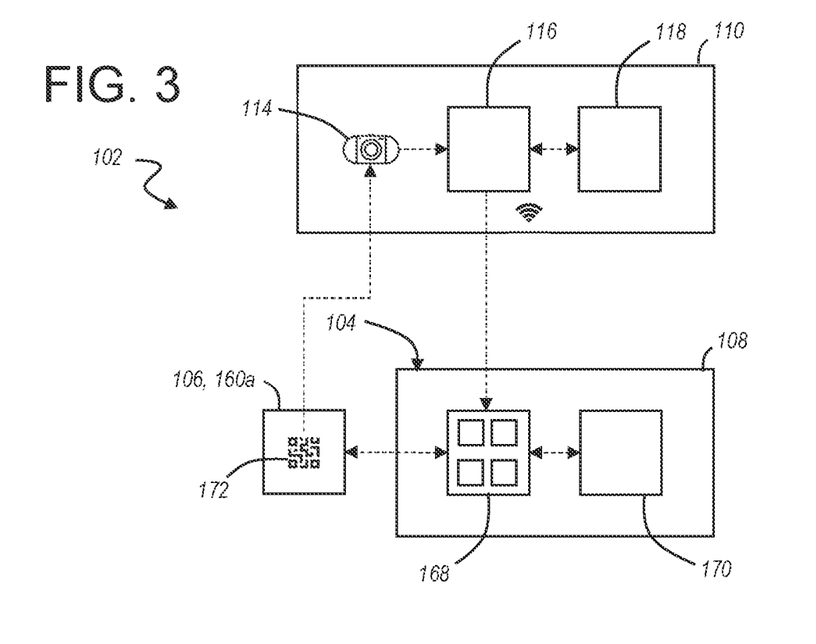
FIG. 3 is an enlarged view of one portion of the scalable infotainment system of FIG. 1, illustrating the multimedia system having a media player for displaying a machine readable optical label adapted to be captured by the cameras such that the cameras can determine a common streaming protocol that is supported by the media player and the camera.

Referring to FIG. 3, the multimedia system 104 is further configured to use a machine readable optical label 172 (e.g., a linear barcode, a 2D barcode such as a QR code etc.) to determine the common streaming protocol that is supported by the media player 106 and the associated camera 110. More specifically, the media player 106 is configured to display the machine readable optical label 172 associated with the player software components. The machine readable optical label 172 is adapted to be captured by the cameras 110, such that the controller 116 of the associated cameras 110 can determine the player software components based on the machine readable optical label 172 and the data associated with a plurality of camera software components stored in the memory 118 of the associated camera 110. The controller 116 generates the media signal associated with the media stream by using the common streaming protocol. The processor 168 receive the media signal from the camera 110 via the second network, and the processor 168 is programmed to transmit the media signal to the media player 106. The media player 106 plays the media stream by using the common streaming protocol that is supported by the associated camera 110 and the media player 106.

Figure 4:
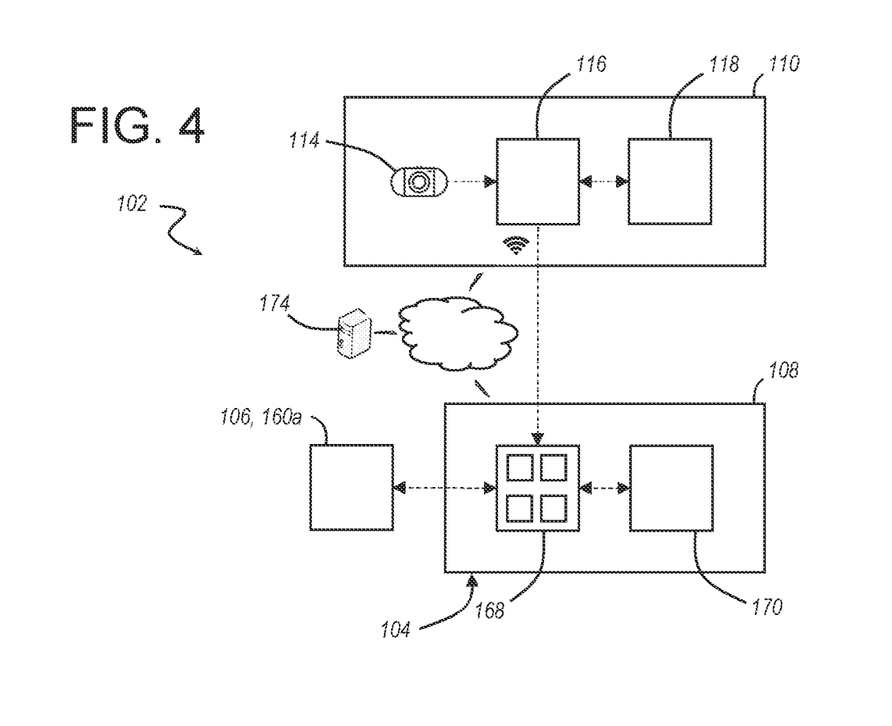
FIG. 4 is an enlarged view of one portion of the scalable infotainment system of FIG. 1, illustrating the scalable infotainment system including a remote server operated by a streaming configuration management service provider and transmitting data associated with a plurality of player software components of the media player to the camera.

Referring to FIG. 4, the scalable infotainment system 102 further includes one or more remote servers 174 storing data associated with the player software components supported by the media player 106 and data associated with the camera software components supported by the associated camera 110. More specifically, in this non-limiting example, the data associated with the multimedia system 104 (e.g., the player software components supported by the media player 106, the SSID, the password, the streaming URL, the camera identifier, the resolution, the frame rate, the device type, the field of view parameter, and/or the vehicle stabilization feature parameter) is registered in a remote server 174 operated by a streaming configuration management service provider. Similarly, the data associated with the camera 110 (e.g., the camera software components supported by the camera 110, the SSID, the password, the streaming URL, the resolution, the frame rate, the device type, the field of view parameter, and/or the vehicle stabilization feature parameter) is registered in the same remote server 174. The camera 110 includes a built-in cellular module, with the built-in cellular module configured to use a cellular network to wirelessly connect the controller 116 of the camera to the remote server 174. The controller 116 receives the data associated with the multimedia system (e.g., the player software components etc.) from the remote server 174. The controller 116 of the associated camera 110 can determine the player software components based on the data received from the remote server 174. The controller 116 further determines the common streaming protocol based on the player software components and the camera software components, which is stored in the memory 118 of the camera 110. The controller 116 generates the media signal associated with the media stream by using the common streaming protocol. The processor 168 receives the media signal from the camera 110 via the second network and is programmed to transmit the media signal to the media player 106. The media player 106 plays the media stream by using the common streaming protocol.

Figure 5:
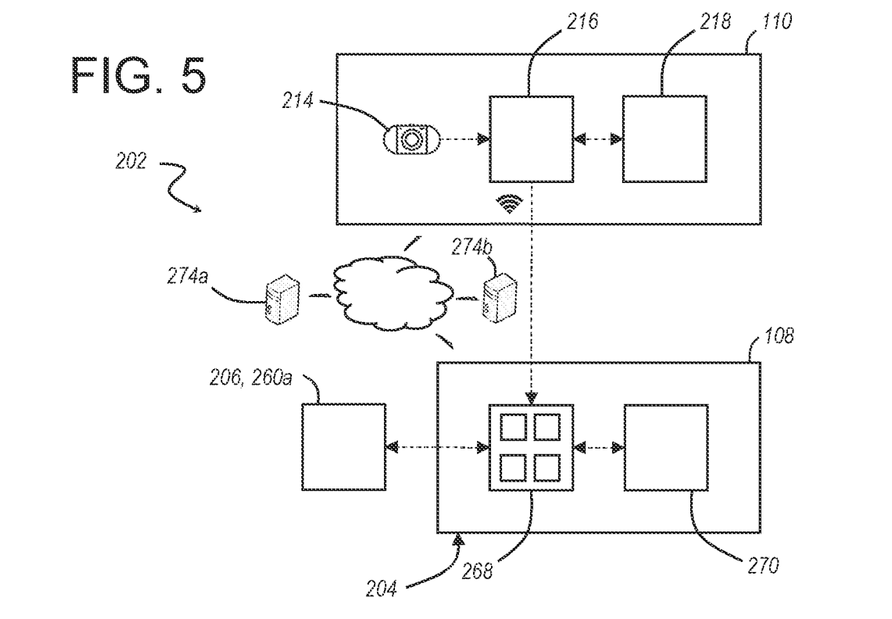
FIG. 5 is an enlarged view of one portion of the scalable infotainment system of FIG. 1, illustrating the scalable infotainment system including first and second remote servers operated by an associated one of first and second streaming configuration management service providers, with the first remote server transmitting data associated with the player software components of the media player to the cameras and the second remote server transmitting data associated with the camera software components of the cameras to the multimedia system.

Referring to FIG. 5, another non-limiting example of a scalable infotainment system 202 is similar to the scalable infotainment system 102 of FIG. 4 and has the same components increased by 100. However, while the scalable infotainment system 102 includes a single remote server 174 operated by one streaming configuration management service provider, the scalable infotainment system 302 includes first and second remote servers 274a, 274b operated by an associated one of first and second streaming configuration management service providers. In this non-limiting example, the data associated with the multimedia system 204 (e.g., the player software components supported by the media player 206, the SSID, the password, the streaming URL, the camera identifier such as a Media Access Control address (MAC address), the resolution, the frame rate, the device type, the field of view parameter, and/or the vehicle stabilization feature parameter) is registered in the first remote server 274a. The data associated with the camera 210 (e.g., the camera software components supported by the camera 210, the SSID, the password, the streaming URL, the resolution, the frame rate, the device type, the field of view parameter, and/or the vehicle stabilization feature parameter) is registered in the second remote server 274b.

Figure 6:
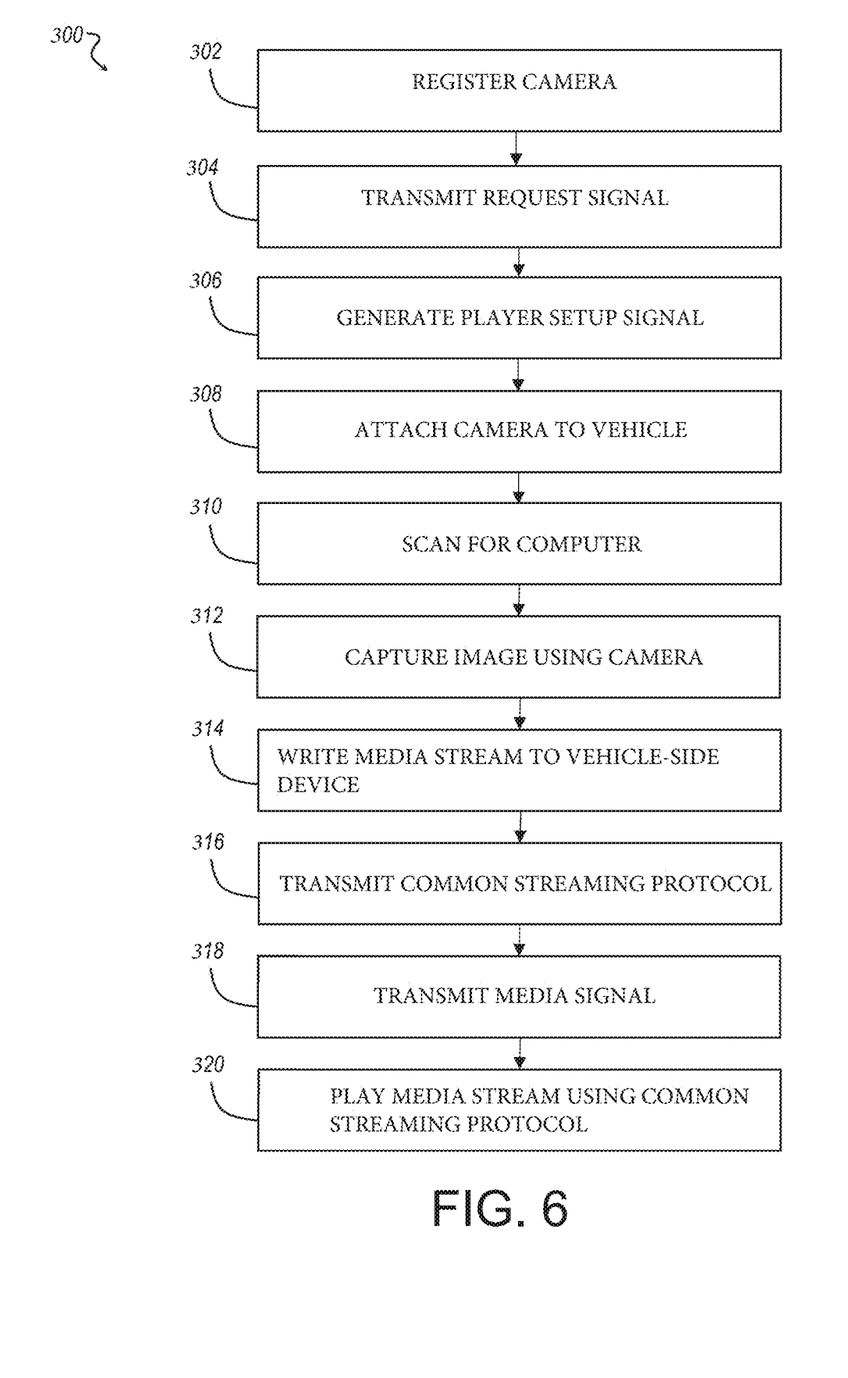
FIG. 6 is a flow chart of one example of a process for operating the multimedia system of FIG. 1.

Referring now to FIG. 6, a non-limiting example of a method 300 is provided for operating the multimedia system 104 for the scalable infotainment system 102 of FIG. 1. The method 300 begins at block 302 with registering, using the controller 116 of the camera 110, the camera 110 by creating a camera-side device file in a camera operating system of the camera 110. The method 300 includes wirelessly connecting the processor 168 to the cameras 110 via, for example, the first network. The method 300 further includes synchronizing, using the controller 116 of the camera 110, a system clock of the camera operating system of the camera with a system clock of a vehicle operating system. The method 300 further includes registering, using the processor 168, the camera 110 by creating a vehicle-side device file in the vehicle operating system of the computer 108.

At block 304, the method 300 further includes transmitting, using the controller 116 via the first network, a request signal to the processor 168 of the computer 108 for the multimedia system 104. The request signal may be indicative of a request by the camera for the camera software components and any other multimedia system parameters from the multimedia system, However, in other non-limiting examples where the HMI display device 160 displays the machine readable optical label 172 that is associated with the player software components and other multimedia system parameters, the method may not include the controller 116 generating the request signal and/or transmitting the request signal to the processor 168 of the computer 108. For instance, as shown in FIG. 3, the camera 110 can capture the image of the machine readable optical label 172 associated with data directed to the player software components and other multimedia system parameters.

At block 306, the method 300 includes generating, using the remote server 174 and/or the processor 168, the player setup signal in response to the remote server 174 and/or the processor 168 receiving the request signal from the controller 116. The player setup signal is associated with data directed to the player software components, the service set identifier (SSID), the password, the streaming Uniform Resource Locator (URL), the camera identifier (e.g., the MAC address), the resolution, the frame rate, the device type, the field of view parameter, and/or the vehicle stabilization feature parameter. The method 300 further includes transmitting, using the remote server 174 and/or the processor 168, the player setup signal to the associated camera 110. The method 300 further includes determining, using the controller 116 of the associated camera 110, the common streaming protocol that is supported by the camera 110 and the media player 106 in response to the controller 116 receiving the player setup signal from the remote server 174 and/or the processor 168. However, in other non-limiting examples, the remote server 174 and/or the processor 168 may not generate the player setup signal and transmit the player setup signal to the controller 116 to determine the common streaming protocol. Continuing with the previous non-limiting example, the camera can capture the image of the machine readable optical label 172 associated with the player software components and other multimedia system parameters. The controller 116 can determine the common streaming protocol based on the data directed to the player software components and other multimedia system parameters and further based on the data directed to the camera software components and other camera parameters stored within the memory 118 of the camera 110.

At block 308, the method 300 further includes releasably attaching one or more cameras 110 to the motor vehicle 100, the trailer 112, the residential building 154, and/or the remote controlled vehicle 156. In other non-limiting examples, the camera can be a handheld camera or a component built into a smartphone, a computer tablet, a laptop computer, and the like. Each one of the cameras 110 supports the camera software components including multiple stream protocols for generating the media signal associated with the media stream, in response to the associated camera 110 capturing the image and/or the video.

At block 310, the method 300 includes scanning, using the controller 116 of the camera 110, for the processor 168 via the second network in response to the controller 116 receiving the data from the remote server 174 and/or the processor 168. The method 300 further includes wirelessly connecting, using the second network, the processor 168 to the associated camera 110 based on the data. However, as previously indicated above for other non-limiting examples, the controller 116 may determine the data from the memory 118 based on the image of the machine readable optical label 172 captured by the camera 110.

At block 312, the method 300 further includes capturing, using the image sensor 114 of the camera 110, the image and/or the video. The method 300 further includes generating, using the controller 116 of the camera 110, the media signal associated with the media stream in response to the image sensor 114 capturing the image and/or the video and the controller 116 processing data (e.g., data directed to the image and/or the video) via the common streaming protocol. The method 300 further includes writing, using the controller 116, data directed to the media stream to the camera-side device file. The method 300 further includes transmitting, using the controller 116, the media signal from the controller 116 of the camera 110 to the processor 168 of the multimedia system 104.

At block 314, the method 300 further includes writing, using the processor 168, the media stream to the vehicle-side device file in response to the processor 168 receiving the medial signal from the controller 116 of the camera 110.

At block 316, the method 300 includes transmitting, using a vehicle-side user application of the processor 168, the common streaming protocol from the controller 116 of the camera 110 to a wireless streaming protocol adaptor 176 of the processor 168, with the wireless streaming protocol adaptor being a kernel functionality. The method 300 further includes processing, using the wireless streaming protocol adaptor 176, the media stream by: decoding the media stream; rendering the media stream; removing, using the wireless streaming protocol adaptor, a plurality of headers associated with a TCP/IP communication from the media stream; and using one of a camera identifier and a MAC address to deliver data traffic to a user space application.

At block 318, the method 300 includes transmitting, using the processor 168, the media signal from the processor 168 to the media player 106 in response to the processor 168 processing data associated with the media stream.

At block 320, the method 300 includes playing, using the media player 106, the media stream by using the common streaming protocol that is supported by the associated camera 110 and the media player 106.

The processors may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the processors may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A multimedia system for a scalable infotainment system of a motor vehicle, the scalable infotainment system including a camera that is releasably attachable to the motor vehicle and not native to the multimedia system, with the camera supporting a plurality of camera software components for generating a media signal associated with a media stream in response to the camera capturing at least one of an image and a video, the multimedia system comprising:
a media player attached to the motor vehicle; and
a computer attached to the motor vehicle and including:
at least one processor electrically communicating with the media player; and
a non-transitory computer readable storage medium storing a plurality of player software components that comprises a plurality of streaming protocols, and the non-transitory computer readable storage medium further storing instructions such that the at least one processor is programmed to:
wirelessly connect with the camera;
generate a player setup signal including data associated with the player software components;
transmit the player setup signal to the camera, with the camera determining a common one of the streaming protocols supported by the media player and the camera, and the camera generating the media signal by using the common one of the streaming protocols;
receive the media signal from the camera by using the common one of the streaming protocols; and
transmit the media signal to the media player, with the media player playing the media stream by using the common one of the streaming protocols.

2. The multimedia system of claim 1 wherein the at least one processor generates the player setup signal including data further associated with: at least one of a service set identifier (SSID), a password, a streaming Uniform Resource Locator (URL), a camera identifier, a resolution, a frame rate, a device type, a field of view parameter, and a vehicle stabilization feature parameter.

3. The multimedia system of claim 2 wherein the at least one processor is wirelessly connectable with the camera via a first network, with the first network being capable of supporting a first capacity of connected devices and having a first bandwidth, and the at least one processor transmits data associated with the player software components to the camera via the first network.

4. The multimedia system of claim 3 wherein the media player comprises a Human Machine Interface (HMI) touchscreen display device for generating an input signal in response to the HMI touchscreen display device receiving an input from a user, where the at least one processor generates a command signal and transmits the command signal to the camera via the first network in response to the at least one processor receiving the input signal from the HMI touchscreen display device, and the camera performs a predetermined function in response to the camera receiving the command signal from the at least one processor.

5. The multimedia system of claim 4 wherein the media player is configured to display a machine readable optical label associated with the player software components and adapted to be captured by the camera, such that the camera determines the player software components based on the machine readable optical label.

6. The multimedia system of claim 5 wherein the at least one processor is further wirelessly connectable to the camera via a second network, with the second network being capable of supporting a second capacity of connected devices that is higher than the first capacity of connected devices associated with the first network, the second network further having a second bandwidth that is higher than the first bandwidth associated with the first network, and the at least one processor receiving the media signal from the camera via the second network.

7. A scalable infotainment system for a motor vehicle, the scalable infotainment system comprising:
at least one camera releasably attachable to the motor vehicle, the at least one camera capturing at least one of an image and a video, and the at least one camera supporting a plurality of camera software components for generating a media signal associated with a media stream in response to the at least one camera capturing at least one of an image and a video; and
a multimedia system integrated within the motor vehicle, the multimedia system comprising:
a media player attached to the motor vehicle; and
a computer attached to the motor vehicle and including
at least one processor electrically communicating with the media player, the computer further including a non-transitory computer readable storage medium storing a plurality of player software components that comprises a plurality of streaming protocols, and the non-transitory computer readable storage medium further storing instructions such that the at least one processor is programmed to:
wirelessly connect with the at least one camera;
generate a player setup signal including data associated with the player software components;
transmit the player setup signal to the at least one camera, with the at least one camera determining a common one of the streaming protocols supported by the media player and the at least one camera, and the at least one camera generating the media signal by using the common one of the streaming protocols;
receive the media signal from the at least one camera by using the common one of the streaming protocols; and
transmit the media signal to the media player, with the media player playing the media stream by using the common one of the streaming protocols; and
wherein the at least one camera is not native to the multimedia system.

8. The scalable infotainment system of claim 7 wherein the at least one processor generates the player setup signal including data further associated with: at least one of a service set identifier (SSID), a password, a streaming Uniform Resource Locator (URL), a camera identifier, a resolution, a frame rate, a device type, a field of view parameter, and a vehicle stabilization feature parameter.

9. The scalable infotainment system of claim 8 wherein the associated camera includes a controller receiving the player setup signal from the at least one processor, with the controller determining the common one of the streaming protocols in response to the controller receiving the player setup signal from the at least one processor of the computer.

10. The scalable infotainment system of claim 9 wherein the at least one processor is connectable to the associated camera via a first network, with the first network being capable of supporting a first capacity of connected devices and having a first bandwidth, and the at least one processor transmitting data associated with the player software components to the associated camera via the first network.

11. The scalable infotainment system of claim 10 wherein the media player comprises a Human Machine Interface (HMI) touchscreen display device for generating an input signal in response to the HMI touchscreen display device receiving an input from a user, where the at least one processor generates a command signal and transmits the command signal to the associated camera via the first network in response to the at least one processor receiving the input signal from the HMI touchscreen display device, such that the associated camera performs a predetermined function in response to the associated camera receiving the command signal from the at least one processor.

12. The scalable infotainment system of claim 11 wherein the associated camera includes an access point for connecting to a second network and is configured to perform the predetermined function, with the predetermined function comprising at least one of the associated camera being disposed in a power-saving sleep mode, enabling the access point, and disabling the access point.

13. The scalable infotainment system of claim 11 wherein the media player is configured to display a machine readable optical label that is associated with the player software components and adapted to be captured by the associated camera, such that the associated camera determines the player software components based on the machine readable optical label.

14. The scalable infotainment system of claim 13 wherein the at least one processor is further wirelessly connectable to the associated camera via a second network, with the second network being capable of supporting a second capacity of connected devices that is higher than the first capacity of connected devices associated with the first network, the second network further having a second bandwidth that is higher than the first bandwidth associated with the first network, and the at least one processor receives the media signal from the associated camera via the second network.

15. The scalable infotainment system of claim 14 further comprising at least one remote server storing data associated with the player software components, and the associated camera comprises a built-in cellular module, with the built-in cellular module configured to use a cellular network to connect the controller to the at least one remote server, such that the controller of the associated camera receives the data associated with the player software components from the at least one remote server.

16. A method of operating a multimedia system for a scalable infotainment system of a motor vehicle, the scalable infotainment system including at least one camera and a multimedia system, with the multimedia system including a media player and a computer having at least one processor and a non-transitory computer readable storage medium storing a plurality of player software components that comprises a plurality of streaming protocols, the method comprising:

releasably attaching the at least one camera to at least one of the motor vehicle, a trailer, a building, and a remote controlled vehicle;

wirelessly connecting the at least one processor to an associated one of the cameras;

generating, using at least one of a remote server and the at least one processor, a player setup signal including data associated with the player software components;

transmitting, using at least one of a remote server and the at least one processor, the player setup signal to the associated camera;

determining, using the at least one camera, a common one of the streaming protocols supported by the media player and the at least one camera in response to the at least one camera receiving the player setup signal;

wirelessly connecting, using a second network via the common one of the streaming protocols, the at least one processor to the associated camera;

capturing, using an image sensor of the at least one camera, at least one of an image and a video;

generating, using the at least one camera, a media signal associated with a media stream by using the common one of the streaming protocols in response to the image sensor capturing at least one of the image and the video;

receiving, using the at least one processor via the second network, the media signal from the at least one camera;

transmitting, using the at least one processor, the media signal to the media player; and playing, using the media player, the media stream by using the common one of the streaming protocols.

17. The method of claim 16 further comprising:

generating, using at least one of a remote server and the at least one processor, the player setup signal including data further associated with: at least one of a service set identifier (SSID), a password, a streaming Uniform Resource Locator (URL), a camera identifier, a resolution, a frame rate, a device type, a field of view parameter, and a vehicle stabilization feature parameter; and scanning, using a controller of the associated camera, for the second network in response to the controller receiving the data from at least one of the remote server and the at least one processor.

18. The method of claim 16 further comprising:

registering, using a controller of the associated camera, the associated camera by creating a camera-side device file in a camera operating system of the associated camera;

transmitting, using the controller, a request signal to the at least one processor;

registering, using the at least one processor, the associated camera by creating a vehicle-side device file in a vehicle operating system in response to the at least one processor receiving the request signal from the associated camera;

writing, using the controller, data to the camera-side device file in response to the associated camera capturing at least one of the image and the video;

transmitting, using the controller, the media signal to the at least one processor; and generating, using the controller of the associated camera, the media signal associated with the media stream.

19. The method of claim 16 further comprising:

registering, using a controller of the associated camera, the associated camera by creating a camera-side device file in a camera operating system of the associated camera;

synchronizing, using a controller of the associated camera, a system clock of the camera operating system of the associated camera with a system clock of a vehicle operating system;

transmitting, using the controller, a request signal to the at least one processor, with the request signal including data associated with at least a device type and traffic information;

registering, using the at least one processor, the associated camera by creating a vehicle-side device file in the vehicle operating system in response to the at least one processor receiving the request signal from the associated camera;

capturing, using an image sensor of the associated camera, at least one of the image and the video;

generating, using the controller, the media signal in response to the controller processing data associated with at least one of the image and the video;

writing, using the controller of the associated camera, the media stream to the camera-side device file;

writing, using the at least one processor, the media stream to the vehicle-side device file in response to the at least one processor receiving the medial signal from the controller of the associated camera; and playing, using the media player, the media stream in response to the at least one processor processing data associated with the media stream.

20. The method of claim 16 further comprising:

transmitting, using a vehicle-side user application of the at least one processor, the common one of the streaming protocols from the controller of the associated camera to a wireless streaming protocol adaptor of the at least one processor, with the wireless streaming protocol adaptor being a kernel functionality; and processing, using the wireless streaming protocol adaptor, the media stream by at least one of:

decoding the media stream;

rendering the media stream;

removing, using the wireless streaming protocol adaptor, a plurality of headers associated with a TCP/IP communication from the media stream; and using a camera identifier to deliver data traffic to a user space application.

* * * * *